US012002396B2

(12) United States Patent
Sun

(10) Patent No.: US 12,002,396 B2
(45) Date of Patent: Jun. 4, 2024

(54) POWER MANAGEMENT CIRCUIT AND TIMING CONTROLLER FOR DISPLAY DEVICE

(71) Applicant: LX Semicon Co., Ltd., Daejeon (KR)

(72) Inventor: Yang Sun, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/552,260

(22) Filed: Dec. 15, 2021

(65) Prior Publication Data

US 2022/0198980 A1 Jun. 23, 2022

(30) Foreign Application Priority Data

Dec. 18, 2020 (KR) .......................... 10-2020-0177993

(51) Int. Cl.
*G06F 1/32* (2019.01)
*G06F 1/3234* (2019.01)
*G06F 1/3287* (2019.01)
*G09G 3/20* (2006.01)

(52) U.S. Cl.
CPC ............. *G09G 3/20* (2013.01); *G06F 1/3265* (2013.01); *G06F 1/3287* (2013.01); *G09G 2310/08* (2013.01); *G09G 2330/021* (2013.01)

(58) Field of Classification Search
None
See application file for complete search history.

(56) References Cited

U.S. PATENT DOCUMENTS

| 8,736,543 | B2 | 5/2014 | Kubota et al. | |
|---|---|---|---|---|
| 9,774,254 | B2 | 9/2017 | Chae et al. | |
| 2011/0292018 | A1 | 12/2011 | Kubota et al. | |
| 2012/0120067 | A1* | 5/2012 | Kim | G09G 3/3648 345/419 |
| 2014/0176524 | A1* | 6/2014 | Lee | G09G 3/3233 345/212 |
| 2014/0362124 | A1* | 12/2014 | Kim | G09G 3/3233 345/77 |
| 2015/0364982 | A1 | 12/2015 | Chae et al. | |
| 2016/0104450 | A1* | 4/2016 | Lee | G09G 3/3688 345/211 |
| 2019/0172379 | A1* | 6/2019 | Park | H02M 3/158 |
| 2021/0201792 | A1* | 7/2021 | Lee | G09G 3/3275 |

FOREIGN PATENT DOCUMENTS

| JP | 2011248215 A | 12/2011 |
|---|---|---|
| KR | 10-1582471 B1 | 1/2016 |
| KR | 2017-0124913 A | 11/2017 |
| KR | 2020-0117849 A | 10/2020 |
| KR | 10-2215986 B1 | 2/2021 |

* cited by examiner

*Primary Examiner* — Danny Chan
(74) *Attorney, Agent, or Firm* — ROTHWELL, FIGG, ERNST & MANBECK, P.C.

(57) ABSTRACT

The present embodiment relates to a power management circuit and timing controller for a display device. The power management circuit optimizes power consumption by receiving analysis information from a timing controller capable of analyzing image data and changing an operating condition for a power conversion circuit based on the analysis information.

13 Claims, 8 Drawing Sheets

POWER MANAGEMENT CIRCUIT AND TIMING CONTROLLER FOR DISPLAY DEVICE

CROSS-REFERENCES TO RELATED APPLICATION

This application claims priority from Korean Patent Application No. 10-2020-0177993, filed on Dec. 18, 2020, which is hereby incorporated by reference for all purposes as if fully set forth herein.

BACKGROUND

1. Technical Field

The present embodiment relates to a power management circuit and timing controller technology for a display device.

2. Related Art

A display device includes a power management circuit. The power management circuit is also called as a power management integrated circuit (abbreviated as PMIC).

The power management circuit chiefly performs a function of converting system power supplied from a commercial power source or a battery based on characteristics of parts included in a display device, and supplying the converted system power. For example, if a voltage of system power and operating voltages of parts are different, the power management circuit converts the voltage of the system power and supplies the converted voltage to the parts.

The power conversion process may experience a power loss. Various attempts to minimize such a power loss have been made as low power driving recently emerges.

SUMMARY

Various embodiments are directed to providing a technology for optimizing power consumption in a display device.

In one aspect, an embodiment provides a power management circuit including a switch driving circuit configured to drive at least one power switch and a control circuit configured to receive a control signal from a timing controller and change a driving condition for the switch driving circuit in response to the control signal.

The panel may be a liquid crystal display (LCD) panel. The control circuit may control a bias current of an amplifier configured to supply a voltage to a common electrode of the panel in response to the control signal.

The control signal may include information on the size of a change of image data between frames. The control circuit may control the amplifier so that the bias current is increased as the change size is increased.

In another aspect, an embodiment provides a timing controller including a load analysis circuit configured to analyze image data for each frame and calculate a panel load of each frame and a communication circuit configured to generate a control signal corresponding to the size of the panel load and transmit the control signal to a power management circuit.

The communication circuit may transmit the control signal in a frame unit.

As described above, according to the present embodiments, power consumption in a display device can be optimized.

DETAILED DESCRIPTION

Figure 1:
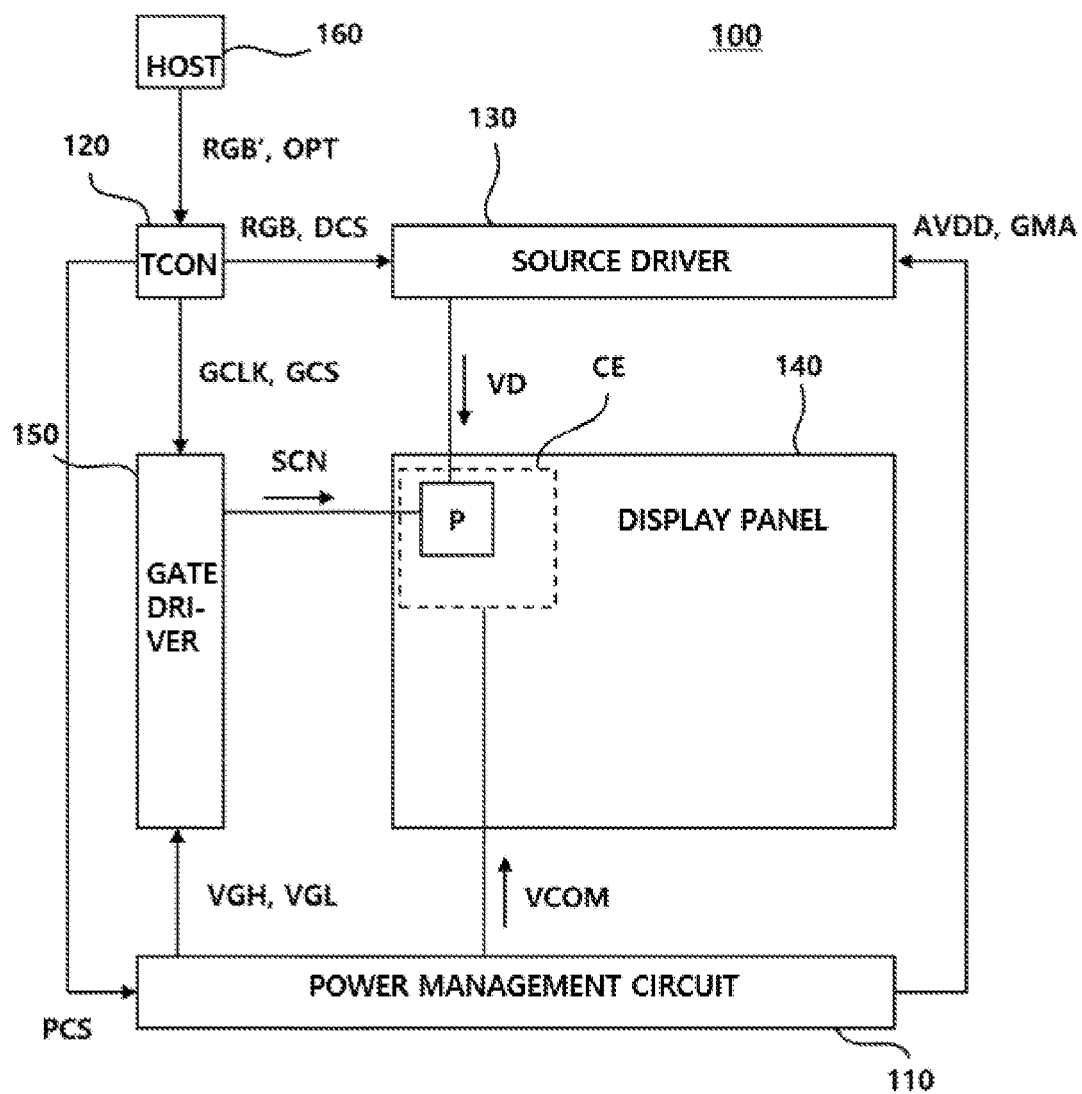
FIG. 1 is a configuration diagram of a display device according to an embodiment.

FIG. 1 is a configuration diagram of a display device 100 according to an embodiment.

Referring to FIG. 1, the display device 100 may include a display panel 140, a host 160, a timing controller 120, a source driver 130, a gate driver 150, a power management circuit 110, etc.

Multiple pixels P may be disposed in the display panel 140. The multiple pixels P may be connected to the source driver 130 through data lines and connected to the gate driver 150 through scan lines.

The pixel P may be formed in a liquid crystal type and may be formed in a light emitting diode (LED) type or an organic light emitting diode (OLED) type. Hereinafter, an example in which the pixel P is formed in the liquid crystal type is described for convenience of description.

A pixel electrode may be disposed in the pixel P. Furthermore, brightness of each pixel P may be determined based on the size of a voltage formed between the pixel electrode and a common electrode CE.

The gate driver 150 may supply a scan signal SCN to a scan line. When the scan signal SCN is supplied to the scan line, a corresponding pixel P may be connected to a data line. A data voltage VD supplied to the corresponding data line may be supplied to the pixel P, more accurately, the pixel electrode.

Multiple scan lines may be disposed in the display panel 140. The gate driver 150 may supply the scan signal SCN sequentially to the multiple scan lines in response to a scan clock GCLK.

The gate driver 150 may receive the scan clock GCLK and a gate control signal GCS from the timing controller 120. Furthermore, the gate driver 150 may generate the scan signal SCN in response to the scan clock GCLK and the gate control signal GCS.

The scan signal SCN may consist of a gate high voltage VGH and a gate low voltage VGL. The gate high voltage VGH and the gate low voltage VGL may be supplied from the power management circuit 110 to the gate driver 150.

When the pixel P is connected to the data line in response to the scan signal SCN, the source driver 130 may supply the data voltage VD to the data line. Furthermore, brightness of the pixel P may be adjusted based on the size of the data voltage VD.

The source driver 130 may receive image data RGB and a data control signal DCS from the timing controller 120, may generate the data voltage VD in response to the image data RGB and the data control signal DCS, and may supply the data voltage VD to the pixel P.

The image data RGB may include a grayscale value of each pixel P. The source driver 130 may check a grayscale value of each pixel P based on the image data RGB, may generate the data voltage VD corresponding to the grayscale value, and may supply the data voltage VD to each pixel P. In this case, timing at which the data voltage VD is supplied to each pixel P may be determined by the data control signal DCS.

Since the grayscale value of each pixel P included in the image data RGB is a digital value, the source driver 130 may include a digital-to-analog converter (DAC) for converting the digital value into an analog voltage and an output buffer for amplifying the analog voltage.

The power management circuit 110 may supply a gamma voltage GMA to the DAC and supply a driving voltage AVDD to the output buffer. Furthermore, the source driver 130 may convert the digital value into the analog voltage by using the gamma voltage GMA, and may amplify the analog voltage into the data voltage VD by using the driving voltage AVDD.

The size of power used to amplify the data voltage VD may be greatly influenced by a pattern of the image data RGB. For example, if the image data RGB in a previous frame and a current frame are the same each other, the size of power used to amplify the data voltage VD may be small. In general, power used for the output of the data voltage VD is used to store parasitic capacitance formed in the display panel 140. If the image data RGB in a previous frame and a current frame are the same as each other, the size of power used to amplify the data voltage VD may be small because parasitic capacitance does not need to be stored or discharged. In contrast, if there is a great difference between grayscale values of the respective pixels P in the image data RGB in a previous frame and a current frame, the size of power used to amplify the data voltage VD is also increased because power necessary to store or discharge parasitic capacitance is also increased.

Power used when the pixel P is driven along with the storing and discharging of parasitic capacitance may be called a panel load.

The timing controller 120 may analyze a pattern of the image data RGB and calculate the size of a panel load. For example, the timing controller 120 may determine that the size of a panel load is great if a pattern of the image data RGB is dynamic. Furthermore, the timing controller 120 may determine that the size of a panel load is small if a pattern of the image data RGB represents a static image.

The timing controller 120 converts original image data RGB', supplied by the host 160, into a form which may be understood by the source driver 130. In addition to such a conversion, the timing controller 120 may analyze a pattern of the image data RGB and calculate the size of a panel load.

The timing controller 120 may quantitatively calculate the size of a panel load. Furthermore, the timing controller 120 may discretely calculate the size of a panel load. For example, the timing controller 120 may divide the size of a panel load into three steps. If a pattern of the image data RGB is dynamically changed like a moving image, the timing controller 120 may determine the size of a panel load as the greatest step. Furthermore, if a pattern of the image data RGB has a static form like a photo, the timing controller 120 may determine the size of a panel load as the smallest step. Furthermore, the timing controller 120 may determine a pattern of the image data RGB between the two steps as a middle step.

The timing controller 120 may generate a power control signal PCS based on the size of a panel load, and may transmit the power control signal PCS to the power management circuit 110.

Furthermore, the power management circuit 110 may differently control a driving condition for a power conversion circuit in response to the power control signal PCS.

For example, the power management circuit 110 may differently control a switching frequency of the power conversion circuit in response to the power control signal PCS. Alternatively, if the power conversion circuit includes a plurality of power switches connected in parallel, the power management circuit 110 may differently control the number of power switches driven in response to the power control signal PCS.

For another example, the power management circuit 110 may supply a common voltage VCOM to the common electrode CE by using an amplifier. The power management circuit 110 may differently control a bias current of the amplifier in response to the power control signal PCS.

As described above, if the power management circuit 110 changes the driving condition for the power conversion circuit in response to the power control signal PCS, power consumption can be reduced. The power management circuit 110 may have different efficiency depending on the size of a panel load and the driving condition. The power management circuit 110 according to an embodiment may operate in an optimal driving condition, suitable for the size of a panel load, by changing the driving condition based on the size of the panel load.

A user may randomly change a driving condition for the power management circuit 110 if not the size of a panel load. For example, the host 160 may recognize a user manipulation and transmit, to the timing controller 120, option information OPT based on the user manipulation. Furthermore, the timing controller 120 may recognize the driving condition included in the option information OPT, may generate the power control signal PCS based on the driving condition, and may transmit the power control signal PCS to the power management circuit 110. Furthermore, the power management circuit 110 may change the driving condition in response to the power control signal PCS.

Figure 2:
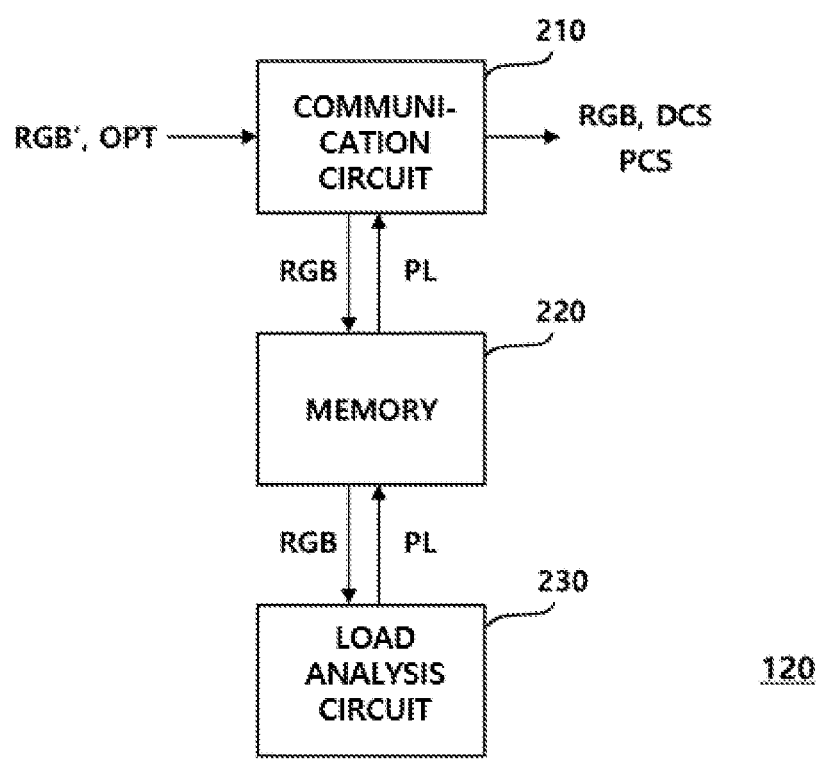
FIG. 2 is a configuration diagram of a timing controller according to an embodiment.

FIG. 2 is a configuration diagram of the timing controller according to an embodiment.

Referring to FIG. 2, the timing controller 120 may include a communication circuit 210, a memory 220, a load analysis circuit 230, etc.

The communication circuit 210 may receive the original image data RGB' and the option information OPT from the host.

The original image data RGB' is converted into the image data RGB in a form which may be understood by the source driver. The timing controller 120 may further include a conversion circuit (not illustrated) for such a conversion.

Furthermore, the communication circuit 210 may transmit the image data RGB to the source driver. Furthermore, the communication circuit 210 may transmit the data control signal DCS to the source driver and transmit the power control signal PCS to the power management circuit.

The image data RGB may be stored in the memory 220 in a frame unit.

Furthermore, the load analysis circuit 230 may analyze the image data RGB for each frame and calculate a panel load PL of each frame. Furthermore, the load analysis circuit 230 may store the panel load PL in the memory 220.

The communication circuit 210 may generate the power control signal PCS in a way to correspond to a size of the panel load PL, and may transmit the generated power control signal PCS to the power management circuit.

The communication circuit 210 may transmit the power control signal PCS to the power management circuit through a single wire. If the timing controller 120 and the power management circuit share the ground, the timing controller 120 may perform serial communication through the single wire. The communication circuit 210 may transmit the power control signal PCS through such serial communication.

The communication circuit 210 may receive the option information OPT from the host. The option information OPT may include mode information. The communication circuit 210 may generate the power control signal PCS by further using the mode information. The mode information, which is information indicative of a power saving mode, may include data divided into a normal mode, a power saving mode, an ultra power saving mode, etc.

The load analysis circuit 230 may calculate the size of the panel load PL in a frame unit. The communication circuit 210 may transmit the power control signal PCS in a frame unit based on the size of the panel load PL.

The load analysis circuit 230 may calculate the size of the panel load PL based on the size of a change of the image data RGB between frames.

The power management circuit may receive the power control signal PCS and change the driving condition in response to the power control signal PCS.

Figure 3:
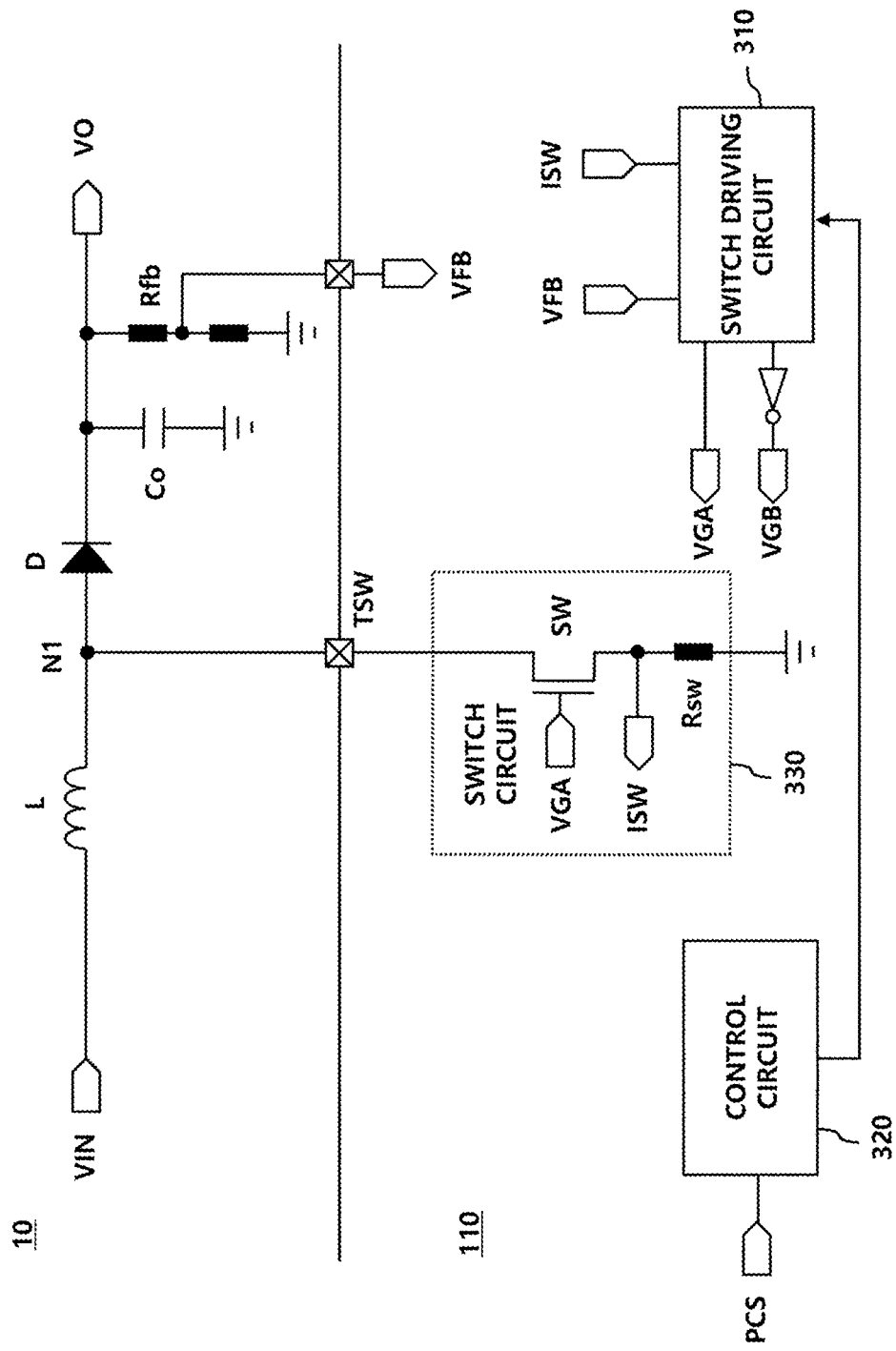
FIG. 3 is a configuration diagram of a power conversion circuit and a power management circuit according to an embodiment.

FIG. 3 is a configuration diagram of the power conversion circuit and the power management circuit according to an embodiment.

Referring to FIG. 3, the power conversion circuit 10 may include an inductor L, a capacitor Co, at least one power switch SW and a diode D. Furthermore, the power management circuit 110 may include a switch circuit 330, a switch driving circuit 310 and a control circuit 320.

The at least one power switch SW may be classified as being included in the power management circuit 110, or may be classified as being included in the power conversion circuit 10. In FIG. 3, the at least one power switch SW has been illustrated as being included in the power management circuit 110, but may be understood as one element of the power conversion circuit 10.

FIG. 3 illustrates an example in which the power conversion circuit 10 has been implemented in the form of a Buck converter, but the power conversion circuit 10 may be implemented in another form including a boost converter. An example in which the power conversion circuit 10 has a form of the Buck converter is hereinafter described for convenience of description.

In the power management circuit 110, the at least one power switch SW may be connected to a first node N1 of the power conversion circuit 10 through a switch terminal TSW. In this case, the first node N1 may be a node to which the inductor L and the diode D are connected.

When the at least one power switch SW is turned on, energy is stored in the inductor L due to a voltage difference between both ends of the inductor L. Furthermore, the energy stored as described above is transmitted to the capacitor Co through the diode D when the at least one power switch SW is turned off. As such a process is periodically repeated, an input voltage VIN is converted into an output voltage VO.

The switch driving circuit 310 may operate the power conversion circuit by driving the at least one power switch SW. The switch driving circuit 310 may generate a gate signal VGA, and may transmit the gate signal VGA to the gate terminal of the at least one power switch SW. According to an embodiment, the diode D may also be replaced with a power switch. In this case, a gate inversion signal VGB may be supplied to the power switch.

The switch driving circuit 310 may sense a feedback voltage VFB, corresponding to the output voltage VO, through a feedback resistor Rfb included in the power conversion circuit 10. Furthermore, the switch driving circuit 310 may drive the at least one power switch SW in response to the feedback voltage VFB.

The switch driving circuit 310 may sense a current ISW flowing into the at least one power switch SW through a current sensor Rsw connected in series to the at least one power switch SW, and may drive the at least one power switch SW in response to the current ISW.

The control circuit 320 may receive the power control signal PCS from the timing controller. Furthermore, the control circuit 320 may change a driving condition for the switch driving circuit 310 in response to the power control signal PCS.

In this case, the driving condition may mean conditions that affect the driving of the at least one power switch SW. For example, a switching frequency of the at least one power switch SW may correspond to one driving condition. For another example, if the at least one power switch SW consists of a plurality of power switches, the number of power switches driven among the plurality of power switches may correspond to another driving condition.

The control circuit 320 may receive the power control signal PCS from the timing controller, and may adjust the switching frequency of the at least one power switch SW in response to the power control signal PCS. Alternatively, the control circuit 320 may receive the power control signal PCS from the timing controller, and may adjust the number of driven power switches in response to the power control signal PCS.

Figure 4:
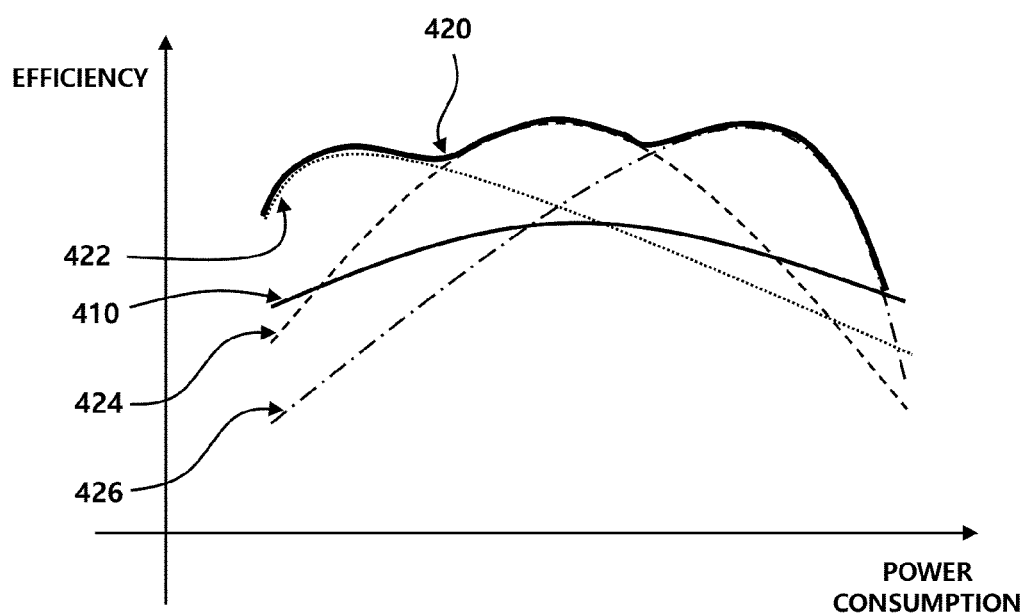
FIG. 4 is a graph illustrating efficiency curves of the power conversion circuit according to a driving condition.

FIG. 4 is a graph illustrating efficiency curves of the power conversion circuit according to a driving condition.

In general, a driving condition for the power conversion circuit is fixed. In general, a conventional power conversion circuit is characterized by having similar (power conversion) efficiency over the entire power consumption region and high efficiency in a middle power consumption region, as in a first efficiency curve 410.

In contrast, the power conversion circuit may have, depending on a driving condition, high efficiency in a low power consumption region as in a second efficiency curve 422, high efficiency in a middle power consumption region as in a third efficiency curve 424, and high efficiency in a high power consumption region as in a fourth efficiency curve 426.

The power management circuit according to an embodiment may receive, from the timing controller, the power control signal including information on the size of a panel load. Furthermore, the power management circuit may drive the power conversion circuit under a first driving condition in which the second efficiency curve 422 is formed in a low power consumption region based on the size of a panel load. Furthermore, the power management circuit may drive the power conversion circuit under a second driving condition in which the third efficiency curve 424 is formed in a middle power consumption region based on the size of a panel load. Furthermore, the power management circuit may drive the power conversion circuit under a third driving condition in which the fourth efficiency curve 426 is formed in a high power consumption region based on a size of a panel load.

In this manner, the power management circuit may obtain a fifth efficiency curve 420 having high efficiency over the entire power consumption region with respect to the power conversion circuit by changing a driving condition for the power conversion circuit based on a size of a panel load.

Figure 5:
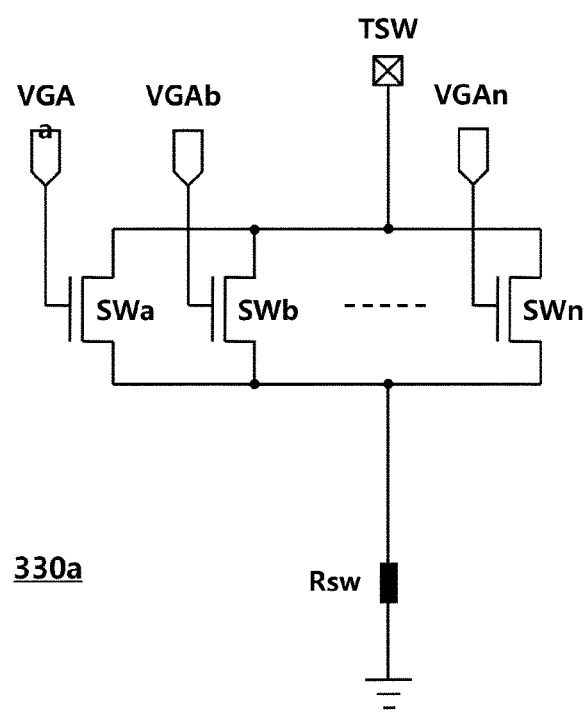
FIG. 5 is a configuration diagram of a switch circuit according to a first example of an embodiment.

FIG. 5 is a configuration diagram of a switch circuit according to a first example of an embodiment.

Referring to FIG. 5, a switch circuit 330a may include a plurality of power switches SWa to SWn constituting the power conversion circuit. In this case, the plurality of power switches SWa to SWn may be interconnected in parallel.

Furthermore, the control circuit of the power management circuit may differently control the number of power switches driven among the plurality of power switches SWa to SWn in response to the power control signal.

For example, the control circuit may decrease the number of driven power switches as the size of a panel load is decreased. Furthermore, the control circuit may increase the number of driven power switches as the size of a panel load is increased.

In general, capacitance may be formed between the drain and source of each of the power switches SWa to SWn. Furthermore, a phenomenon in which charges are stored in and discharged from capacitance occurs in an on and off process for the power switches SWa to SWn. A power loss may occur due to such a phenomenon. Such a loss is also called a switching loss.

When the size of a panel load is small, the control circuit may decrease the number of driven power switches in order to reduce such a switching loss.

Resistance may be formed between the drain and source of each of the power switches SWa to SWn in the state in which each power switch has been turned on. Furthermore, an on resistance loss may occur due to such resistance.

The on resistance loss is increased as a current flows a lot. When the size of a panel load is great, the control circuit may increase the number of driven power switches in order to reduce such an on resistance loss.

Figure 6:
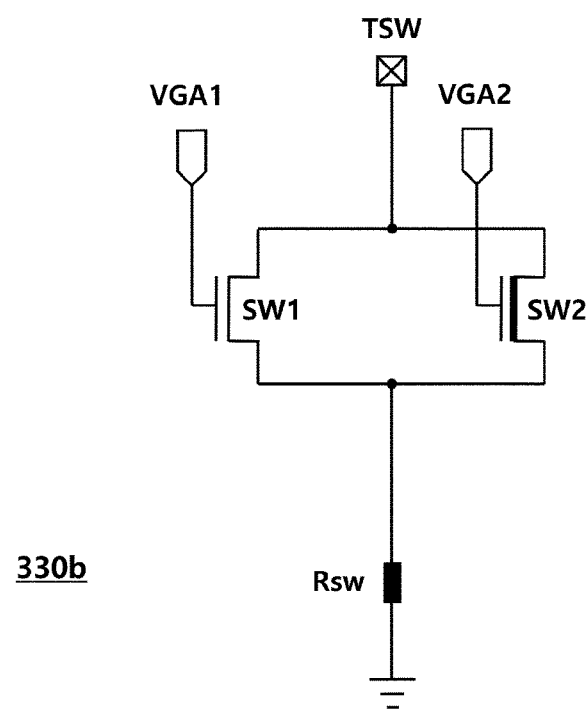
FIG. 6 is a configuration diagram of a switch circuit according to a second example of an embodiment.

FIG. 6 is a configuration diagram of a switch circuit according to a second example of an embodiment.

Referring to FIG. 6, a switch circuit 330b may include a first power switch SW1 and a second power switch SW2 constituting the power conversion circuit.

The first power switch SW1 and the second power switch SW2 may be interconnected in parallel.

Furthermore, the size of the second power switch may be larger than the size of the first power switch. From another viewpoint, a channel width of the second power switch may be wider than a channel width of the first power switch. The power switch may have low on resistance and a better current ability as the channel width thereof is increased. Furthermore, the power switch may have small capacitance and a small switching loss as the channel width thereof is decreased.

The control circuit of the power management circuit may drive the first power switch SW1 and/or the second power switch SW2 in response to the power control signal.

For example, when the size of a panel load is small, the control circuit may drive the first power switch SW1 and may not drive the second power switch SW2. Furthermore, when the size of a panel load is middle, the control circuit may not drive the first power switch SW1 and may drive the second power switch SW2. Furthermore, when the size of a panel load is great, the control circuit may drive both the first power switch SW1 and the second power switch SW2.

The power control signal may consist of data of two bits. Furthermore, the control circuit may determine whether to drive the second power switch SW2 based on a first bit value of data, and may determine whether to drive the first power switch SW1 based on a second bit value of the data.

Figure 7:
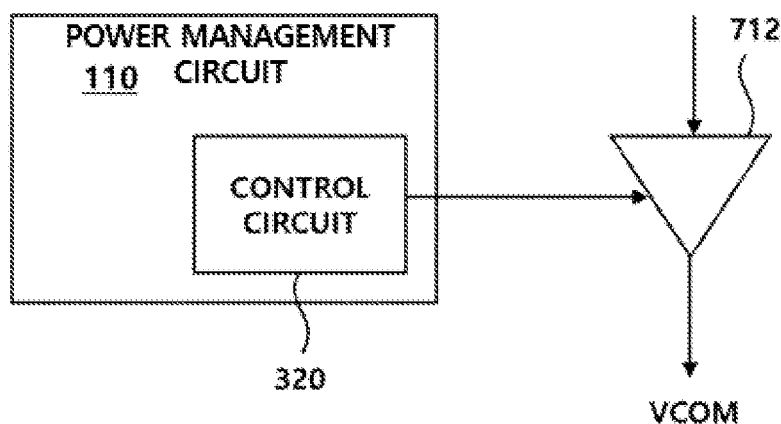
FIG. 7 is a configuration diagram of a power management circuit according to another embodiment.

FIG. 7 is a configuration diagram of a power management circuit according to another embodiment.

Referring to FIG. 7, a power management circuit 710 may further include an amplifier 712 in addition to the elements of the power management circuit 110 illustrated in FIG. 3.

The amplifier 712 may supply the common voltage VCOM to the common electrode of the display panel.

Furthermore, the control circuit 320 of the power management circuit 710 may control the bias current of the amplifier 712.

For example, the control circuit 320 may receive the power control signal from the timing controller. The power control signal may include information on the size of a change of image data between frames. Furthermore, the control circuit 320 may control the amplifier 712 so that the bias current of the amplifier 712 is increased as the change size of image data between frames is increased.

Alternatively, the power control signal may include information on the size of a panel load. The control circuit 320 may control the amplifier 712 so that the bias current of the amplifier 712 is increased as the size of a panel load is increased.

Figure 8:
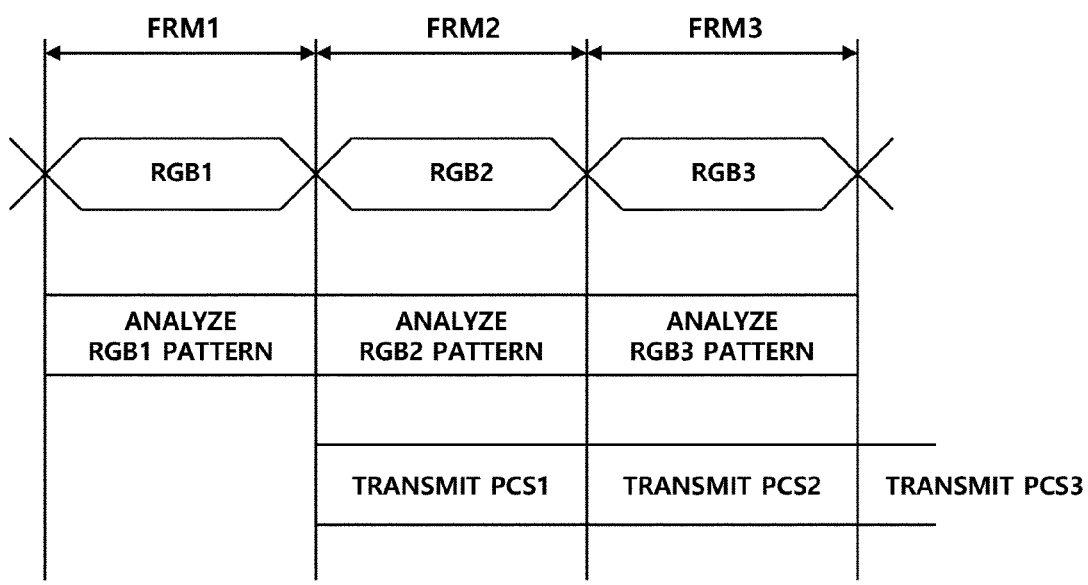
FIG. 8 is a diagram illustrating a flow of a function performed for each frame.

FIG. 8 is a diagram illustrating a flow of a function performed for each frame.

Referring to FIG. 8, the timing controller may receive image data for each frame, and may analyze a pattern of the image data.

The timing controller may receive first image data RGB1 in a first frame FRM1, and may calculate the size of a panel load by analyzing a pattern of the first image data RGB1. Furthermore, the timing controller may receive second image data RGB2 in a second frame FRM2, and may calculate the size of a panel load by analyzing a pattern of the second image data RGB2.

The timing controller may transmit the first image data RGB1 to the source driver in the second frame FRM2, and may transmit, to the power management circuit, a first power control signal PCS1 including information on the size of a panel load of the first image data RGB1. Furthermore, the timing controller may transmit the second image data RGB2 to the source driver in a third frame FRM3, and may transmit, to the power management circuit, a second power control signal PCS2 including information on the size of a panel load of the second image data RGB2.

The source driver may convert the first image data RGB1 into the data voltage in the third frame FRM3, and may drive a pixel. The power management circuit may supply power to the source driver in response to the first power control signal PCS1 in the third frame FRM3, and may supply the common voltage to the common electrode of the panel. Furthermore, the source driver may convert the second image data RGB2 into the data voltage in a fourth frame, and may drive the pixel. The power management circuit may supply power to the source driver in response to the second power control signal PCS2 in the fourth frame, and may supply the common voltage to the common electrode of the panel.

As described above, according to the present embodiment, power consumption in the display device can be optimized.

What is claimed is:

1. A power management circuit connected to a power conversion circuit and a timing controller, comprising:
a switch driving circuit configured to drive a plurality of power switches connected to the power conversion circuit; and
a control circuit configured to receive a control signal from the timing controller and to change a driving condition for the switch driving circuit in response to the control signal, wherein
the plurality of power switches has different channel widths,
the control signal includes information on the size of a panel load,
the control circuit is configured to select at least one power switch based on the size of the panel load and the channel width of each of one or more power switches, and to drive the selected power switch, and
the control circuit is configured to control a bias current of an amplifier configured to supply a voltage to a common electrode of a panel in response to the control signal;
wherein the plurality of power switches comprises a first power switch and a second power switch having a channel width wider than that of the first power switch, and
the size of the second power switch is larger than the size of the first power switch,
in case the size of the panel load is a first value, the control circuit is configured to drive the first power switch and is configured not to drive the second power switch,
in case the size of the panel load is a second value, the control circuit is configured not to drive the first power switch and is configured to drive the second power switch,
in case the size of the panel load is a third value, the control circuit is configured to drive both the first power switch and the second power switch,
the first value is smaller than the second value, and
the second value is smaller than the third value.

2. The power management circuit of claim 1, wherein:
the plurality of power switches is connected in parallel, and
the control circuit is configured to adjust the number of power switches driven in response to the control signal.

3. The power management circuit of claim 2, wherein:
the control circuit is configured to decrease the number of driven power switches as the size of the panel load is decreased.

4. The power management circuit of claim 1, wherein the control circuit is configured to adjust a switching frequency of the at least one power switch in response to the control signal.

5. The power management circuit of claim 1, wherein:
the plurality of power switches comprises a first power switch and a second power switch having a channel width wider than that of the first power switch,
the control circuit is configured to drive the second power switch when the size of the panel load is greater than a reference value and drive only the first power switch when the size of the panel load is smaller than the reference value.

6. The power management circuit of claim 1, wherein:
the plurality of power switches comprises a first power switch and a second power switch having a channel width wider than that of the first power switch,
the control signal comprises data of two bits, and
the control circuit is configured to determine whether to drive the second power switch based on a first bit value of the data and determine whether to drive the first power switch based on a second bit value of the data.

7. The power management circuit of claim 1, wherein power converted by the at least one power switch is supplied to a source driver configured to drive a pixel of the panel.

8. The power management circuit of claim 1, wherein:
the control signal comprises information on the size of a change of image data between frames, and
the control circuit is configured to control the amplifier such that the bias current is increased as the change size is increased.

9. The power management circuit of claim 1, wherein the power management circuit is configured to adjust the number of power switches driven in response to the control signal.

10. The power management circuit of claim 1, wherein the switch driving circuit is configured to sense a feedback voltage, corresponding to an output voltage, through a feedback resistor and the switch driving circuit is configured to drive the at least one power switch in response to the feedback voltage.

11. The power management circuit of claim 1, wherein the switch driving circuit is configured to sense a current flowing into the at least one power switch through a current sensor connected in series with the at least one power switch and is configured to drive the at least one power switch in response to the current.

12. The power management circuit of claim 2, wherein the control circuit is configured to increase the number of driven power switches as the size of a panel load is increased.

13. A method comprising:
using a switch driving circuit, driving a plurality of power switches connected to a power conversion circuit;
receiving at a control circuit a control signal from a timing controller;
using the control circuit, changing a driving condition for the switch driving circuit in response to the control signal, wherein
the plurality of power switches has different channel widths,
the control signal includes information on the size of a panel load,
the method comprises, using the control circuit, selecting at least one power switch based on the size of the panel load and the channel width of each of one or more power switches, and driving the selected power switch, and
the method comprises, using the control circuit, controlling a bias current of an amplifier configured to supply a voltage to a common electrode of a panel in response to the control signal;
wherein the plurality of power switches comprises a first power switch and a second power switch having a channel width wider than that of the first power switch, and
the size of the second power switch is larger than the size of the first power switch,
in case the size of the panel load is a first value, the control circuit is configured to drive the first power switch and is configured not to drive the second power switch, in case the size of the panel load is a second value, the control circuit is configured not to drive the first power switch and is configured to drive the second power switch, in case the size of the panel load is a third value, the control circuit is configured to drive both the first power switch and the second power switch, the first value is smaller than the second value, and the second value is smaller than the third value.

* * * * *